Patented Jan. 3, 1950

2,493,075

UNITED STATES PATENT OFFICE 2,493,075

SETTING AND EXPANDING AGENTS FOR RESINS

William A. La Lande, Jr., Upper Darby, and Harry Green, Philadelphia, Pa., assignors to The Pennsylvania Salt Manufacturing Company, Philadelphia, Pa., a corporation of Pennsylvania No Drawing. Application September 24, 1946, Serial No. 699,088

14 Claims. (Cl. 260—2.5)

This invention relates to a process for the preparation of resinous condensation products, and to the products of this process.

The customary method for the preparation of resinous products, e. g., phenol-aldehyde products, is to react a suitable phenol with a suitable aldehyde to form a solid product. This product is ground to a powder which is molded to the desired shape by the application of heat and pressure. This procedure has many disadvantages since it is not feasible in many instances to employ a hot molding process.

In order to eliminate these difficulties, prior art investigators developed another method by which solid resinous products may be prepared. This method is to prepare a fluid or semi-fluid reaction mixture, e. g. a phenol-aldehyde reaction mixture condensed to the Baekeland "stage A" state of condensation, by methods known to the art, and subsequently to set the mixture to solid form, using a mold if a definite shape is desired, by employing a strong acidic material such as hydrochloric or sulfuric acid as the setting agent. The usual manner of carrying out this process is to condense the reactants to the stage at which the product is fluid or semi-fluid and may be kept as such until a setting agent is added. This method is quite general for resins of the thermosetting type, e. g. phenol-aldehyde, ureaformaldehyde, and melamineformaldehyde resins. By "thermosetting type" resins, as used herein, is meant those resins which, when prepared in the fluid or semi-fluid state, may be hardened to solid form by the application of heat; it is a property of such resins that they may also be set to solid form by the incorporation of acidic materials, such as hydrochloric acid.

This prior art process, and variations thereof known to the art, also has certain disadvantages. For example, it has been found that the reaction mixture frequently "pulls away" from the mold, i. e. the reaction mixture contracts on setting. Other disadvantages include the frequent need for the application of heat to achieve setting in a reasonable time in spite of the addition of a setting agent.

We have now discovered that fluid or semi-fluid thermosetting resinous reaction mixtures may be set to a novel solid, possessing advantages hereinafter described, by employing a compound of the general formula

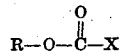

wherein X is a halogen and R is an organic radical, i. e. either an aliphatic (including cycloaliphatic) radical or an aromatic radical, carbocyclic or heterocyclic. Many examples in each of these categories are named hereinbelow. The radical R should not, of course, be such as to destroy the characteristic properties of the haloformate group. We have generally found it convenient to employ a haloformate in which R contains less than 12 carbon atoms.

Examples of our setting agents include the saturated aliphatic chloroformates, e. g., ethyl, propyl, etc., chloroformate, palmityl chloroformate, diethylaminoethyl chloroformate and diethylene glycol bis-chloroformat; olefinic chloroformates, e. g. allyl chloroformate; naphthenic (cycloaliphatic) chloroformates, e. g. cyclohexylethyl chloroformate; acetylenic chloroformates, e. g. propyne-2-chloroformate-1; aryl chloroformates, e. g. phenyl chloroformate; aralkyl chloroformates, e. g. benzyl chloroformate; heterocyclic aliphatic or aromatic chloroformates, e. g. furfuryl chloroformate and 3-pyridyl methyl chloroformate; alkyl bromoformates, e. g. ethyl bromoformate; alkyl fluoformates, e. g. methyl fluoformate, and ethyl fluoformate; and generally the bromine, fluorine and iodine anologs of each of the above-named chloro compounds. Compounds of these classes generally possess the desired property of compatibility with the fluid or semi-fluid thermosetting resins, i. e. they are miscible therewith or will form a uniform dispersion therein. We have discovered that these materials are capable of rapidly setting the fluid reaction mixture at ordinary temperatures, that shrinkage of the reaction mixture on setting may be eliminated and, if desired, an extremely low density product may be produced.

We do not wish to be limited by any theoretical explanation of the mechanism involved in the setting and expansion of resins by our setting agents, but we believe the desired effects are caused by the property we have found to be characteristic of the haloformate group to undergo at least slow hydrolysis in the presence of traces of moisture, such as the moisture formed during the setting of the fluid or semi-fluid thermo-setting resins, thereby releasing hydrogen halide and carbon dioxide, which we believe are formed in the proper proportion and condition so that the one acts advantageously as a setting agent and the other, at just the proper time, acts advantageously as an expansion agent. We believe the hydrogen halide serves to set the resin and the carbon dioxide causes the expansion.

Our experiments have further demonstrated, as hereinafter discussed, that the rate of setting and amount of expansion may be regulated to any reasonably desired value by controlling the percent of setting agent added to the resin and, in some instances, employing other agents in conjunction therewith. External variables, such as temperature and pressure, also effect results, but these are usually predictable and controllable; it is contemplated that our invention can be carried out over the range of temperatures and pressures ordinarily encountered in the setting of these resins, but will usually be practiced at room temperature and atmospheric pressure.

Should it be desired that the resin expand only slightly and set rapidly, the amount of haloformate setting agent added is decreased, and an acidic material such as hydrochloric or sulfuric acid may be added in conjunction therewith. For example, the use of the setting agent of our invention, in conjunction with other acidic materials if desired, may be regulated so that the contraction of the product on setting is precisely counter-balanced by the tendency to expand. In this manner the pulling away from the sides of a mold is eliminated. Thus, in using our product as a bonding agent for bricks, a completely tight bond will be formed since there will be no contraction of the product.

A further advantage of our invention is that by employing an appropriate amount of one or more of our setting agents, the product can be made to expand so that extremely low density resin products are obtained. These products are characterized by discrete uniform cells, resulting in a material substantially uniform in porosity which retains strength comparable to that of the nonporous resin. The chemical inertness generally exhibited by thermosetting type resins is retained in these products. These novel products have the qualities desired in heat and electrical insulating materials, acoustical materials as for sound-proof construction, buoyancy as in life preservers, and the like.

It is evident that our discovery of the use of haloformate materials as setting and expanding agents for fluid or semi-fluid thermosetting resins represents a significant advance in the art in that, to the best of our knowledge, no other material, whose action can be regulated, will act in a similar manner at ordinary temperatures.

As mentioned before, the use of our setting agent may be regulated in order to obtain the type of product desired. For example, if only slight expansion is desired, only a small amount of setting and expanding agent is added, and in order to achieve rapid setting with this small amount of our setting agent, there may be incorporated another setting agent, preferably an acidic material such as hydrochloric acid, in order to speed the cold setting of the product. As little as 0.5% by weight of most of our setting agents, e. g., diethylene glycol bis-chloroformate, is effective in counteracting the tendency to shrink in most applications, but with some of the higher molecular weight agents somewhat more is required. In order to prepare a low density product of say a specific gravity of 0.2, we have found that about 10% by weight of most of our setting agents, e. g., diethylene glycol bis-chloroformate, may advantageously be added, but again the amount varies somewhat with the particular agent used. In this instance it is usually unnecessary to add any additional setting agent. It is known that by heating some types of thermosetting resins, e. g., phenol-aldehyde resins, after they have set to solid form, some desirable properties such as hardness and tensile strength are improved; where desirable this effect of heat may be used to advantage in our processes.

In carrying out the process of our invention one of our setting and expanding agents, as hereinbefore described, may be added to the fluid or semi-fluid resinous reaction mixture while contained in a mold, or the said components may be mixed and subsequently poured into a mold before appreciable setting has occurred, in order to obtain products of definite shape. An alternative method is to prepare the product in any convenient bulk form, and subsequently to saw or cut the resin to the desired shape.

From the foregoing description of our invention it is evident that the type of product desired, or its application, dictates the amount of setting and expanding agent to be added, and where desirable or necessary, another setting agent may be used in conjunction therewith.

In a preferred method for carrying out the process of our invention a fluid resinous reaction mixture is prepared by methods known to the prior art. For example, a suitable phenolic material such as phenol, cresol, resorcinol and the like may be reacted using a suitable aldehyde such as formaldehyde or its polymers, acetaldehyde, furfural, crotonaldehyde, or aldehyde producing materials such as hexamethylenetetramine. The reaction is stopped when the product has reached the Baekeland "stage A" state of condensation. This preliminary condensation may be performed with either an acidic or basic catalyst, and the ratio of phenol material to aldehyde material may vary from about 1:1 to 1:1.5. We prefer to use the liquid resin resulting from the condensation of phenol with formaldehyde in the proportion of about 1 mol of phenol to about 1.15 mols of formaldehyde, employing sodium hydroxide as the catalyst, and thereafter adding with agitation 20° Bé. hydrochloric acid to a pH of about 1, and continuing the agitation until the desired viscosity is obtained, following by immediate neutralization with aqueous sodium hydroxide to a pH of about 7 to 7.2. The resulting product is washed with water. A filler may be added to the reaction mixture if desired. For example, in some applications quartz, sand, wood flour, graphite, and the like, may advantageously be suspended in the fluid reaction mixture. It is also of advantage, in some applications, to add a plasticizer, such as ethylene glycol diethyl ether, diethylene glycol diethyl ether, beta-ethoxyethyl acetate, diethylene glycol monoethyl ether acetate, etc. Immediately before use, diethylene glycol bis-chloroformate, a preferred setting and expanding agent of our invention whose formula may be represented as

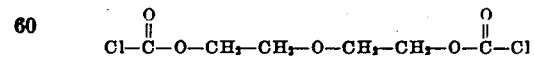

is added to this fluid reaction mixture. As described above the amount to be added varies according to the application or product desired, and other acidic materials may be added in order to speed setting. It is further possible to incorporate our setting agent, either alone or admixed with other acidic material or materials, in the plasticizer as described above, which is added to the resin in this form. If desired, heat may be applied, but we have found this unnecessary in most instances.

The following specific examples are illustrative of the processes and products of our invention. All parts are by weight.

Example 1

A liquid phenol-aldehyde resin in the Baekeland A stage of condensation was prepared by mixing 1.019 parts by weight of phenol, 1 part of Formalin and 0.26 part of 42% sodium hydroxide solution, at a temperature below 50° C., and permitting the resulting solution to stand at 50° C. for about 18 hours. 20° Bé. hydrochlorid acid was added at about 38 to 40° C. with agitation to a pH of about 1. Agitation was continued until the desired consistency was obtained. The mixture was then immediately neutralized with 20% sodium hydroxide to a pH of about 7 to 7.2. The resin was then washed with water. To 90 parts of this resin was added 10 parts of beta-ethoxyethyl acetate plasticizer.

To 95 parts of this resin solution was added with stirring 5 parts of diethylene glycol bis-chloroformate. This mixture was poured into a glass lined mold, and after standing 20 hours at about 18° C., the mixture had expanded to four times its initial volume, and had set to solid form distinctly characterized by discrete cells uniformly dispersed throughout the mass.

Example 2

To 90 parts of the plasticized liquid resin prepared as described in Example 1 was added with agitation 10 parts of diethylene glycol bis-chloroformate. The mixture was poured into a mold similar to the one described in Example 1, and allowed to stand at 27° C. After 24 hours the mixture had expanded to six times its initial volume, and had set to solid form characterized by discrete cells uniformly dispersed throughout the mass.

Example 3

To 89.5 parts of the plasticized liquid resin prepared as described in Example 1 was added with agitation 10.5 parts of diethylene glycol bis-chloroformate. The mixture was poured into a mold similar to the one described in Example 1, and allowed to stand at 4 to 8° C. After 24 hours the mixture was a viscous paste, and no noticeable expansion had occurred. The temperature was raised to about 30° C., and after about 15 hours the mixture had expanded to six times its initial volume, and had set to solid form characterized by unusually small discrete cells uniformly dispersed throughout the mass, the density of which after heating at 60 to 80° C. for a short time, was 0.16 gram per cubic centimeter.

Example 4

To 95 parts of unplasticized liquid resin, prepared as described in Example 1, was added with agitation 5 parts of diethylene glycol bis-chloroformate. The mixture was poured into a mold similar to that described in Example 1. After 24 hours at room temperature the material has expanded almost four times its initial volume, and had set to solid form characterized by discrete pores uniformly dispersed throughout the mass.

Example 5

To 92 parts of the plasticized liquid resin prepared as described in Example 1 was added 8 parts of allyl chloroformate. The mixture was poured into a mold similar to the one described in Example 1, and allowed to stand at room temperature. After 24 hours the mixture had expanded five times its initial volume, and had set to solid form characterized by small discrete cells uniformly dispersed throughout the product.

Example 6

To four portions of plasticized liquid resin prepared as described in Example 1, each representing 100 parts, were added 8 parts of n-propyl, n-butyl, iso-butyl, and n-hexyl chloroformates respectively. The mixtures were poured into molds similar to the one described in Example 1, and allowed to stand at room temperature. Within 30 hours all of the mixtures had expanded to about twice their original volumes, and had set to solid form characterized by small discrete cells uniformly dispersed throughout the mass.

Example 7

To 100 parts of the plasticized liquid prepared as described in Example 1 was added 8 parts of ethylene glycol bis-chloroformate. The mixture was poured into a mold similar to the one described in Example 1. Within 20 hours the mixture had expanded to about twice its initial volume, and had set to solid form characterized by small discrete pores uniformly dispersed throughout the product.

Similarly, the other thermosetting fluid resins, e. g., urea-formaldehyde and melamine-formaldehyde, may be set and expanded just as described in the above examples for phenol-aldehyde fluid resin reaction mixtures. The procedures of the examples may also be carried out employing halogen anologs of the chloroformates named as the setting and expanded agent.

The expressions "fluid" or "liquid" resinous reaction mixtures, as used herein, are intended to include thermosetting condensation products irrespective of their degree of condensation, that are fluid at ordinary temperatures and require further condensation or polymerizaiton to become solid. These condensation products may comprise liquid phase products containing solid filling materials in suspension, as herein described, if desired. It should be further understood that in the references herein to the setting of fluid or liquid resinous reaction mixtures to "solid" form, the word "solid" is not necessarily employed in its strict physico-chemical sense, but is intended to indicate only that the material has become substantially non-fluid at ordinary temperatures.

Since many modifications are possible in the process and product of our invention as above described without departing from the scope of the invention, it is intended that the above description of our invention should be interrupted as illustrative, and the invention is not to be limited except as set forth in the claims which follow.

We claim:

1. A method for setting a fluid acid-settable resinous reaction mixture to solid form, which comprises employing as the setting agent a catalytic amount of a compound whose formula is

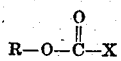

wherein X represents a halogen atom and R is an organic radical that does not prevent hydrolysis of the compound to form a hydrogen halide.

2. A method according to claim 1, wherein R is an organic radical of less than 12 carbon atoms at least partially aliphatic, with an aliphatic carbon atom attached to the haloformate group.

3. A method according to claim 1, wherein R is an organic radical of less than 12 carbon atoms at least partially aliphatic, with an aliphatic carbon atom attached to the haloformate group, and X is a chlorine atom.

4. A method for setting a fluid acid-settable resinous reaction mixture to solid form, which comprises employing as the setting agent a catalytic amount of a compound whose formula is

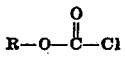

wherein R is an organic radical that does not prevent hydrolysis of the compound to form a hydrogen halide, of less than 12 carbon atoms at least partially aliphatic, with an aliphatic carbon atom attached to the haloformate group, and maintaining the resulting mixture at a temperature in the range of about 65 to 110° F. until it has set to solid form.

5. A method for setting a fluid acid-settable resinous reaction mixture capable of being set to solid form by addition of acidic material, which comprises employing as the setting agent from 0.005 to 0.15 part by weight, per part of fluid reaction mixture, of a compound whose formula is

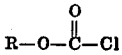

wherein R is an organic radical that does not prevent hydrolysis of the compound to form a hydrogen halide, of less than 12 carbon atoms at least partially aliphatic, with an aliphatic carbon atom attached to the chloroformate group.

6. A method for setting a fluid acid-settable phenol-aldehyde reaction mixture to a porous solid, which comprises mixing the fluid mixture with about 0.005 to 0.15 part by weight, per part of phenol-aldehyde reactants, of a setting agent whose formula is

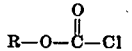

wherein R is an organic radical that does not prevent hydrolysis of the compound to form a hydrogen halide, of less than 12 carbon atoms at least partially aliphatic, with an aliphatic carbon atom attached to the chloroformate group, and maintaining the temperature in the range of about 65 to 110° F. until it has set to solid porous form.

7. Acidproof self-hardening and self-expanding compositions containing a fluid acid-settable resin and a catalytic amount of a compound whose formula is

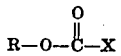

wherein R is an organic radical that does not prevent hydrolysis of the compound to form a hydrogen halide, and X is a halogen atom.

8. Acidproof self-hardening and self-expanding compositions containing a fluid acid-settable resin and a catalytic amount of a compound whose formula is

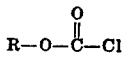

wherein R is an organic radical that does not prevent hydrolysis of the compound to form a hydrogen halide, of less than 12 carbon atoms at least partially aliphatic, with an aliphatic carbon atom attached to the chloroformate group.

9. In a method for setting a fluid acid-settable phenol-aldehyde reaction mixture to the solid form, the improvement that comprises employing at least about 0.1% by weight, based upon the weight of the reaction mixture, of diethylene glycol bis-chloroformate as the setting agent.

10. A method for setting a fluid acid-settable phenol-aldehyde reaction mixture to a porous solid, which comprises mixing said fluid mixture with at least about 0.1% by weight, based upon the weight of the reaction mixture, of diethylene glycol bis-chloroformate and maintaining the resulting mixture at a temperature in the range of about 65 to 110° F. until it has set to solid form.

11. A method for setting a fluid acid-settable phenol-aldehyde reaction mixture to a porous solid, which comprises mixing the fluid mixture with about 0.005 to 0.15 part by weight, per part of phenol-aldehyde reactants, of diethylene glycol bis-chloroformate, and maintaining the resulting mixture at a temperature in the range of about 65 to 110° F. until it has set to a firm solid.

12. Acid-proof self-hardening and self-expanding compositions containing a fluid acid-settable phenol-aldehyde resin capable of being hardened and a catalytic amount of diethylene glycol bis-chloroformate.

13. A substantially acid-proof solid composition comprising a matrix of solid resinous condensation product containing voids therein, said composition being made by the acid-hardening of a fluid acid-settable resinous reaction mixture that normally contracts upon being hardened, employing a setting agent comprising a compound whose formula is

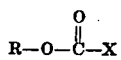

wherein X is a halogen atom and R is an organic radical that does not prevent hydrolysis of the compound to form a hydrogen halide, said composition in hardened form having a volume substantially equal to that of the reaction mixture before setting.

14. The composition of claim 13 in which the resinous reaction mixture is a fluid acid-settable phenolaldehyde resinous reaction mixture and in which the compound of formula

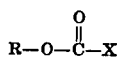

is diethylene glycol bis-chloroformate.

WILLIAM A. LA LANDE, Jr.
HARRY GREEN.

REFERENCES CITED

The following references are of record in the file of this patent:

UNITED STATES PATENTS

| Number | Name | Date |
|---|---|---|
| 2,103,768 | Dietz et al. | Dec. 28, 1937 |
| 2,376,653 | Boyer | May 22, 1945 |
| 2,401,138 | Coes | May 28, 1946 |

FOREIGN PATENTS

| Number | Country | Date |
|---|---|---|
| 406,286 | Great Britain | Feb. 15, 1934 |